United States Patent
Mueller et al.

(10) Patent No.: US 6,346,714 B1
(45) Date of Patent: Feb. 12, 2002

(54) METHOD AND DEVICE FOR PROCESSING A PHOTOSTIMULATABLE IMAGE PLATE

(75) Inventors: Juergen Mueller; Walter Bauer, both of Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/284,216

(22) PCT Filed: Nov. 6, 1997

(86) PCT No.: PCT/EP97/06177

§ 371 Date: Apr. 9, 1999

§ 102(e) Date: Apr. 9, 1999

(87) PCT Pub. No.: WO98/21624

PCT Pub. Date: May 22, 1998

(30) Foreign Application Priority Data

Nov. 12, 1996 (DE) .......................................... 196 46 606

(51) Int. Cl.⁷ .............................................. B54H 5/00
(52) U.S. Cl. ..................................................... 250/589
(58) Field of Search ........................... 250/589; 414/411

(56) References Cited

U.S. PATENT DOCUMENTS

| | | | | |
|---|---|---|---|---|
| 3,888,587 A | * | 6/1975 | Perl ........................... 355/112 |
| 4,234,795 A | * | 11/1980 | Muller ....................... 52/284.4 |
| 4,455,671 A | | 6/1984 | Farrar | |
| 4,553,369 A | * | 11/1985 | Debes et al. ................... 53/55 |
| 4,704,530 A | * | 11/1987 | Tamura et al. .............. 250/589 |
| 4,908,514 A | | 3/1990 | Bauer et al. | |
| 5,493,128 A | | 2/1996 | Boutet ......................... 250/584 |

FOREIGN PATENT DOCUMENTS

| | | |
|---|---|---|
| DE | 3733191 | 4/1989 |
| EP | 0307760 | 3/1989 |

* cited by examiner

Primary Examiner—Constantine Hannaher
Assistant Examiner—Shun Lee
(74) Attorney, Agent, or Firm—Milde, Hoffberg & Macklin, LLP

(57) ABSTRACT

The invention relates to a method for processing a photo-stimulatable image plate (8). The image plate (8) is taken out of a cassette (1, 40), processed and placed back in the same cassette (1, 40), the cassette being conveyed from an input station (20) to an output station (22). The cassette (1, 40) is rotated about a vertical axis during conveyance once the image plate is taken out of the cassette and before said plate is reinserted in the same cassette.

13 Claims, 5 Drawing Sheets

METHOD AND DEVICE FOR PROCESSING A PHOTOSTIMULATABLE IMAGE PLATE

BACKGROUND OF THE INVENTION

The present invention concerns a method and device for processing photostimulable image plate as whereby an image plate is taken out of a cassette, processed and then placed back in the same cassette while the cassette is transported from an input station to an output station Photostimulable phosphor-coated film is increasingly employed instead of conventional film to produce x-rays for medical diagnoses. One advantage of a phosphor-coated film as a graphic reference material is its almost linear reproduction characteristic. This means that the gray scale or scale of densities of the image carrier matches the dose of radiation beamed onto it. Images obtained with photostimulable image plates are accordingly much less sensitive to excess or insufficient radiation. Another advantage of photostimulable image plates or phosphor-coated film is that they can be used over and over. Once the plate or film has been developed and the image interpreted and stored electronically, it can be erased and re-exposed.

Still another advantage of a phosphor-coated film is that it can be handled extensively like conventional x-ray film, and much existing processing equipment (e.g. cassettes, film loading-and-unloading mechanisms, etc.) can be used.

A method of and a device for handling photostimulatable phosphor-coated film is known, for example, from the European Patent No. 307,760 B1. The film is loaded into a cassette, such identifying information as patient's name and date of birth, physician's name, etc. is entered in a semiconductor memory on the cassette, and the film is exposed, leaving a latent image. To develop the image, the cassette is inserted into a digital reader, wherein it is opened and the film extracted and swept with radiation to stimulate it. The light emitted by the film is collected by a light collector and converted into a grid of pixels, restoring the image. The pixels can also be transmitted to a digital image processor for further treatment handling as desired.

There is a drawback to this approach. The footprint of the equipment employed to read out the film is relatively large in that the film is inserted into it from one direction, extracted from the cassette therein, and extracted in essentially the same direction for photoelectric scanning. Because of the many items of electronic equipment employed in hospitals, floor space in hospitals is at a premium.

Devices for processing photostimulable phosphor-coated film that occupy less area are known from the German Patent No. 3,733,191 C2 and the U.S. Pat. No. 5,493,128. In these devices the cassettes are forwarded vertically during processing. They are inserted into the device in one direction, displaced thereto, unloaded, and ejected in another direction. The cassettes, finished or in process, are coordinated in specific positions, especially in accordance with the U.S. Pat. No. 5,493,128, in relative complicated sorting mechanisms.

SUMMARY OF THE INVENTION

The principal object of the present invention is, accordingly, a method of and a device for processing photostimulable phosphor-coated image plates or film that will be as simple as possible and that will occupy as little area as possible.

This object, as well as other objects which will become apparent from the discussion that follows, are achieved, in accordance with the present invention, by a method whereby the cassette is rotated about a vertical axis after the image plate is extracted from it and before the image plate is returned to it. The invention also provides a device having an extraction station with an extraction mechanism for extracting the image plate from the cassette and thereafter returning the image plate to it. This extraction station rotates about a vertical axis after the plate is extracted from the cassette and before the plate is returned thereto.

In accordance with the present invention, the loaded cassette is rotated around a vertical axis while being forwarded. The cassette is opened in one position and the plate or film extracted and transported to the photoelectric scanner. While the plate or film is being scanned, the cassette, advantageously still open, is rotated farther to accept the scanned plate or film. The cassette is forwarded in a horizontal position in this embodiment. In another advantageous embodiment, however, the cassette can be forwarded essentially upright, resting on edge and tilted less than 45° to the vertical. This approach saves a lot of space inside the processor. A processor in accordance with this embodiment can also handle two cassettes at once, one ready to be unloaded and the other to be loaded. Such a device can process considerably more plates or film at a time than can be processed at the state of the art.

In one advantageous embodiment of the present invention, the cassette is forwarded to the film-extraction location in one direction horizontally and opened, and the plate or film extracted from it. The cassette is then rotated 180° around a vertical axis into a film-insertion position, where the photoelectrically scanned plate or film is returned to the cassette and the cassette closed. The cassette is then finally forwarded in opposition to the original direction to the delivery location, where it can be picked up at any time.

Both the cassette-insertion location (input station) and the cassette-delivery location (output station) can constitute temporary-storage locations, each accommodating several cassettes. The insertion end of the device can accordingly be continuously exploited and the cassettes picked up at the other end as time permits without impeding the operation of the device as a whole.

One particular advantage is that the whole device can be operated from one side, both of the directions traveled by the cassettes paralleling the controls.

Several locations can be included at both ends, where the cassettes can be sorted as they are inserted and ejected.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
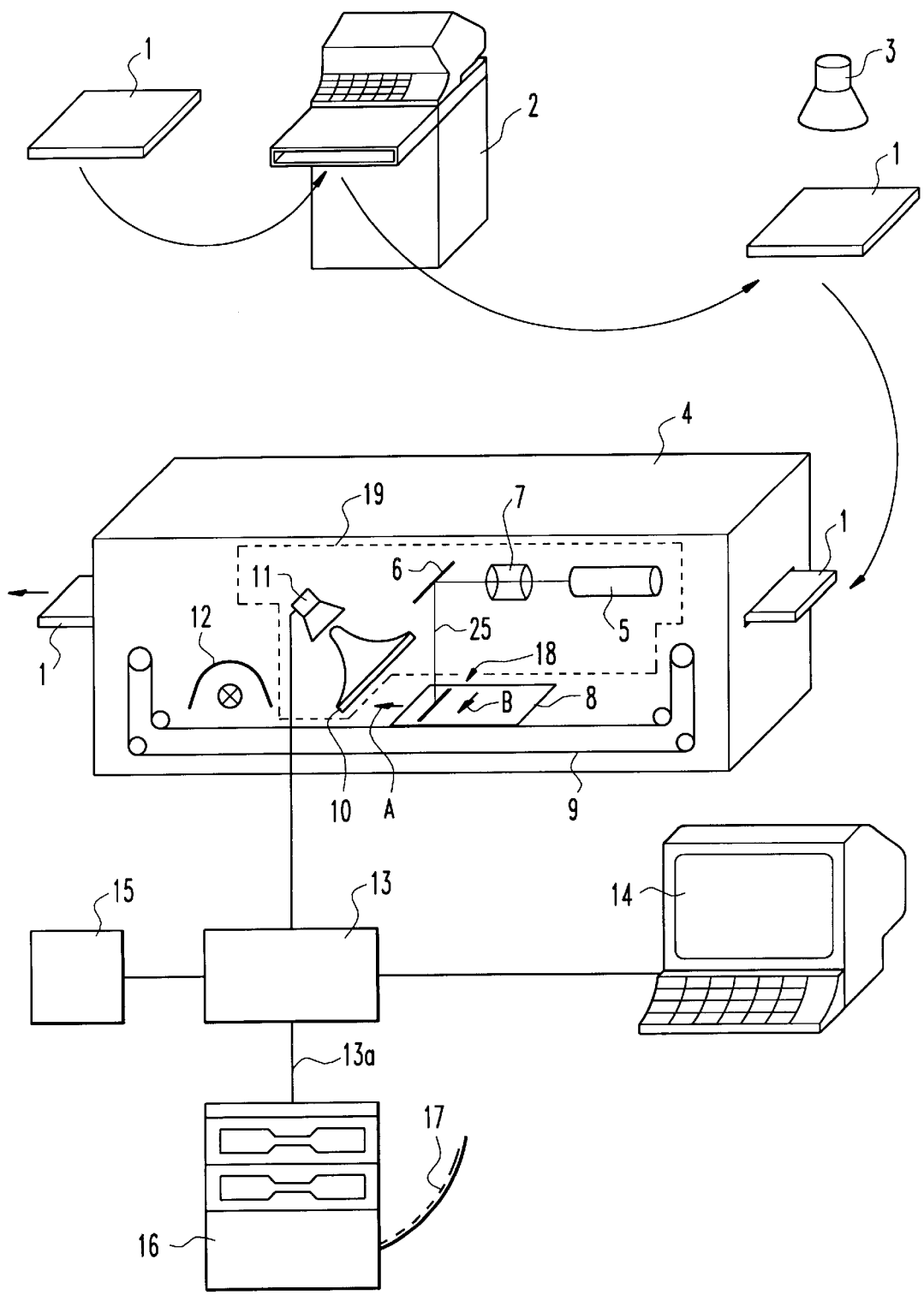
FIG. 1 schematically illustrates a state-of-the-art device for processing photostimulable phosphor-coated plates or film.

The preferred embodiments of the present invention will now be described with reference to FIGS. 1–5 of the drawings. Identical elements in the various figures are designated with the same reference numerals.

FIG. 1 shows the essential components of a device of the type disclosed in the aforesaid references for processing photostimulable image plates or film.

The term "film", as used hereinafter, shall mean and include any type of photostimulatable image plate. Many of the same components are also employed in the device in accordance with the present invention. An x-ray cassette 1 is loaded with a photostimulable image plate, especially phosphor-coated film. Cassette 1 is introduced into an identification station 2, where such relevant information as patient name, body region imaged, name of attending physician, etc. is entered into a semiconductor memory from an input console. The same information can alternatively be entered directly from an electromagnetic card. Specific film-processing instructions can also be entered from a menu. Once the cassette has been provided with the relevant information, the film is exposed to an x-ray tube 3. The film will now carry a latent image. The film, 8, is now read by introducing cassette 1 into a processor 4, where an unillustrated mechanism opens it and extracts the film.

A film transport 9 in the form of a belt now transports film 8 to a reading location 18 accommodating a reader 19 that comprises such optical, mechanical, and electronic components as a laser 5, a lens 7, a pivoting or rotating-polyhedral mirror 6, a photomultiplier 11, and light conductors 10. Laser 5 emits a beam 25 capable of stimulating film 8. The beam can be infrared, red, or green, depending on the type of film being processed. Lens 7 focuses the beam on film 8. Mirror 6 directs the beam location by location and line by line onto film 8 in direction B.

Light is now emitted from the latent image on film 8. Light conductors 10 collect the light and convey it to photomultiplier 11, which amplifies the signal. The signal is now digitalized and transmitted to a computer 13 with a graphic memory. The signal can now be processed in a known manner, passed through filters, an anti-alias filter for instance, and/or be electronically compressed. While being read, film 8 is transported by film transport 9 in slow-scan direction A.

Once film 8 has been scanned, it is erased by an eraser 12 and returned to cassette 1, ready for the next exposure.

In computer 13, the digitalized image can be stored in a digital memory 15, displayed for interpretation on a screen 14, or transmitted by way of a digital interface 13a to hard-copy equipment 16 for transfer to photographic film 17. The data can also be transmitted to other imaging systems through digital interface 13a.

Figure 2:
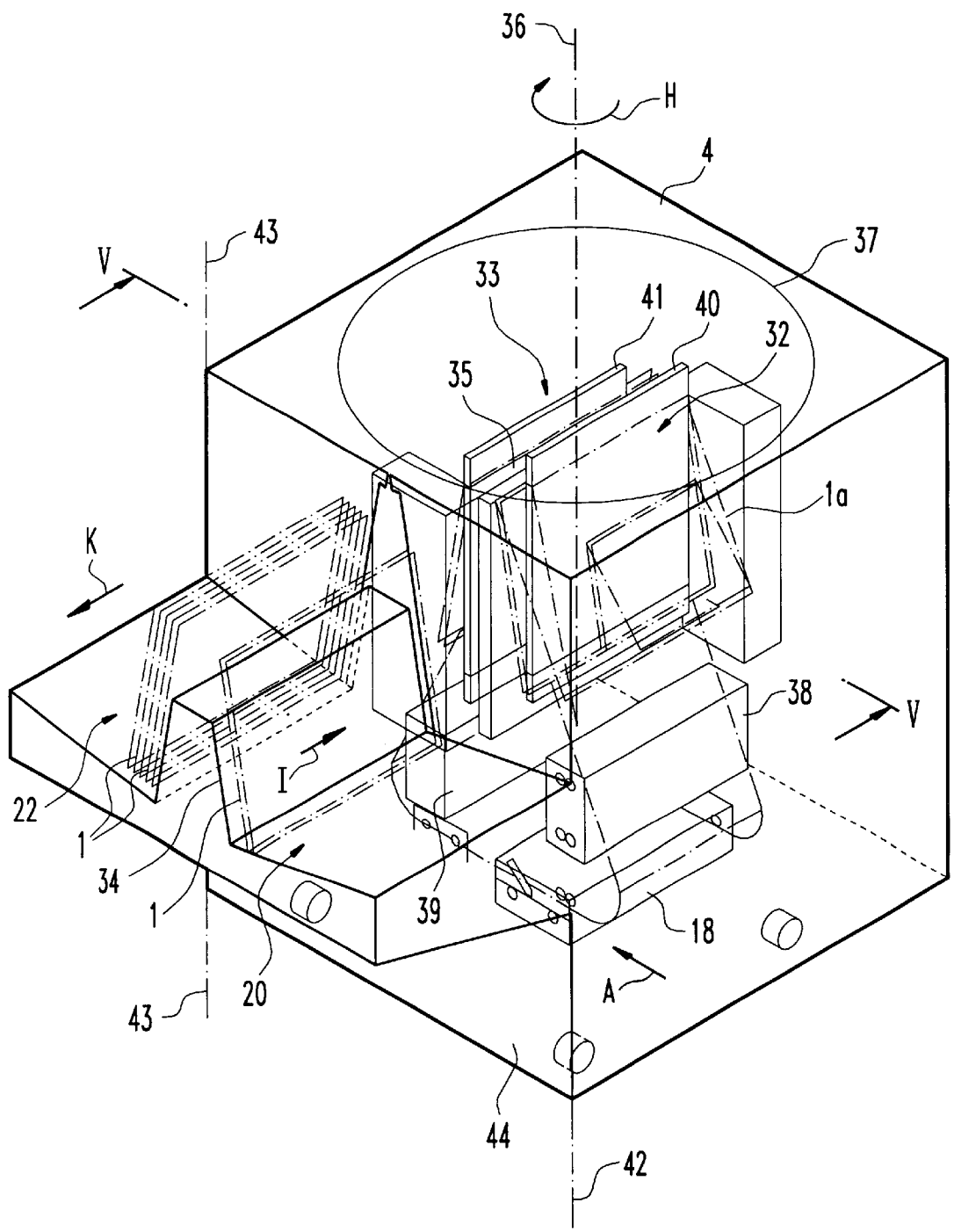
FIG. 2 illustrates one embodiment of a device in accordance with the present invention for processing photostimulable phosphor-coated plates or film.

FIG. 2 illustrates one embodiment of a processor 4 for processing photostimulable phosphor-coated film. It includes an input station or cassette-insertion location 20, a film-extraction location 35, and an output station or cassette-delivery location 22. Cassette-insertion location 20 and cassette-delivery location 22 constitute temporary-storage locations, accommodating up to twenty cassettes 1. Cassettes 1 have a flat bottom, a cover hinged thereto, and several sides. Resting on one side, they are maintained essentially upright at locations 20 and 22, leaning at an angle of no more than 20° and preferably of only 1° to a vertical axis 36. Cassette-insertion location 20 and cassette-delivery location 22 are essentially mutually symmetrical with respect to a plane that parallels insertion direction I. Both locations are hinged to the housing 44 of processor 4, cassette-insertion location 20 around an axis 42 that coincides with one lateral edge of the processor and cassette-delivery location 22 around a similar axis 43 that coincides with the opposite edge of the processor. This structure allows access to the inside of the device for maintenance and repair, and any film jammed inside it can easily be removed.

A mechanism forwards the cassette 1 resting against the wall 34 of cassette-insertion location 20 to the film-extraction location 35 inside processor 4 in direction I. Cover 1a swings out, opening the cassette, e.g. cassette 40, inside the processor, and an extraction mechanism 38 extracts the film. The film is now transported to a reading location 18, where it is scanned at high precision along slow-scan direction A, detecting any graphical data stored on the film. Once the data has been scanned, it is entirely erased from the film by a lamp 26. The film is then transported back to cassette 40 in the opposite direction and loaded back into it at a location opposite the cassette-delivery side of film-extraction location 35. Film-extraction location 35, which can rotate up to 360° in a circle 37 around vertical axis 36 in direction H, rotates 180° to allow the film to be loaded. Film-extraction location 35 is, like cassette-insertion location 20 and cassette-delivery location 22, symmetrical, essentially with respect to the same plane, and accordingly has two sides 32 and 33. A cassette can be inserted into each side and both processed simultaneously. One cassette can also be unloaded while another, e.g. cassette 41, is being loaded. This considerably accelerates the processor's overall sequence of operations. Still another advantage is that cassettes of different formats can be handled by the same device. Various such formats as accommodated in side 32 of film-extraction location 35 are indicated by the discontinuous lines.

A cassette is reloaded at the output side of film-extraction location 35 by a loading mechanism 39. Due to the overall symmetry of the device, the components of loading mechanism 39 can be extensively similar to those of film-extraction mechanism 38. Such a processor is very simple.

Once cassette 41 has been reloaded, it is forwarded to cassette-delivery location 22 in direction K. The cassettes are ejected in sequence and maintained ready at cassette-delivery location 22. The holding capacities of cassette-insertion location 20 and cassette-delivery location 22 allow extensive automatization and hence full exploitation of the device without waiting.

Figure 3:
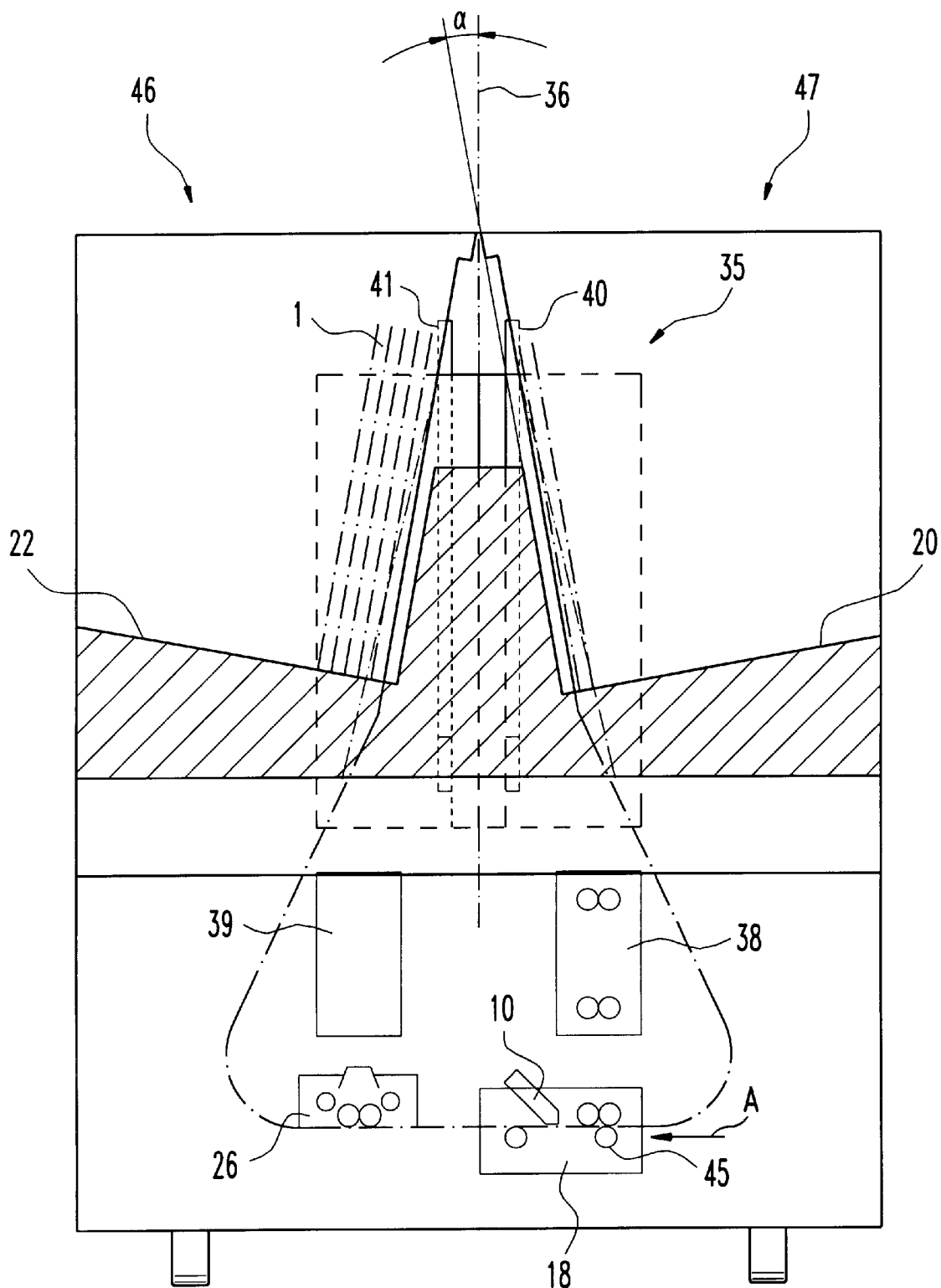
FIG. 3 is a section through the device illustrated in FIG. 2.

FIG. 3 is a section along the line V-V through the device illustrated in FIG. 2 showing the essential components of cassette-insertion location 20 and cassette-delivery location 22 along with the schematically represented essentially upright cassettes 1 temporarily accommodated therein. Vertical axis 36 divides the overall device into essentially symmetrically disposed halves, specifically an insertion-end half 47 and a delivery-end half 46. A light conductor 10 and a set 45 of film-transport rollers are represented in reading location 18. The relatively acute angle α between the cassettes and vertical axis 36 is approximately 10°.

Figure 4:
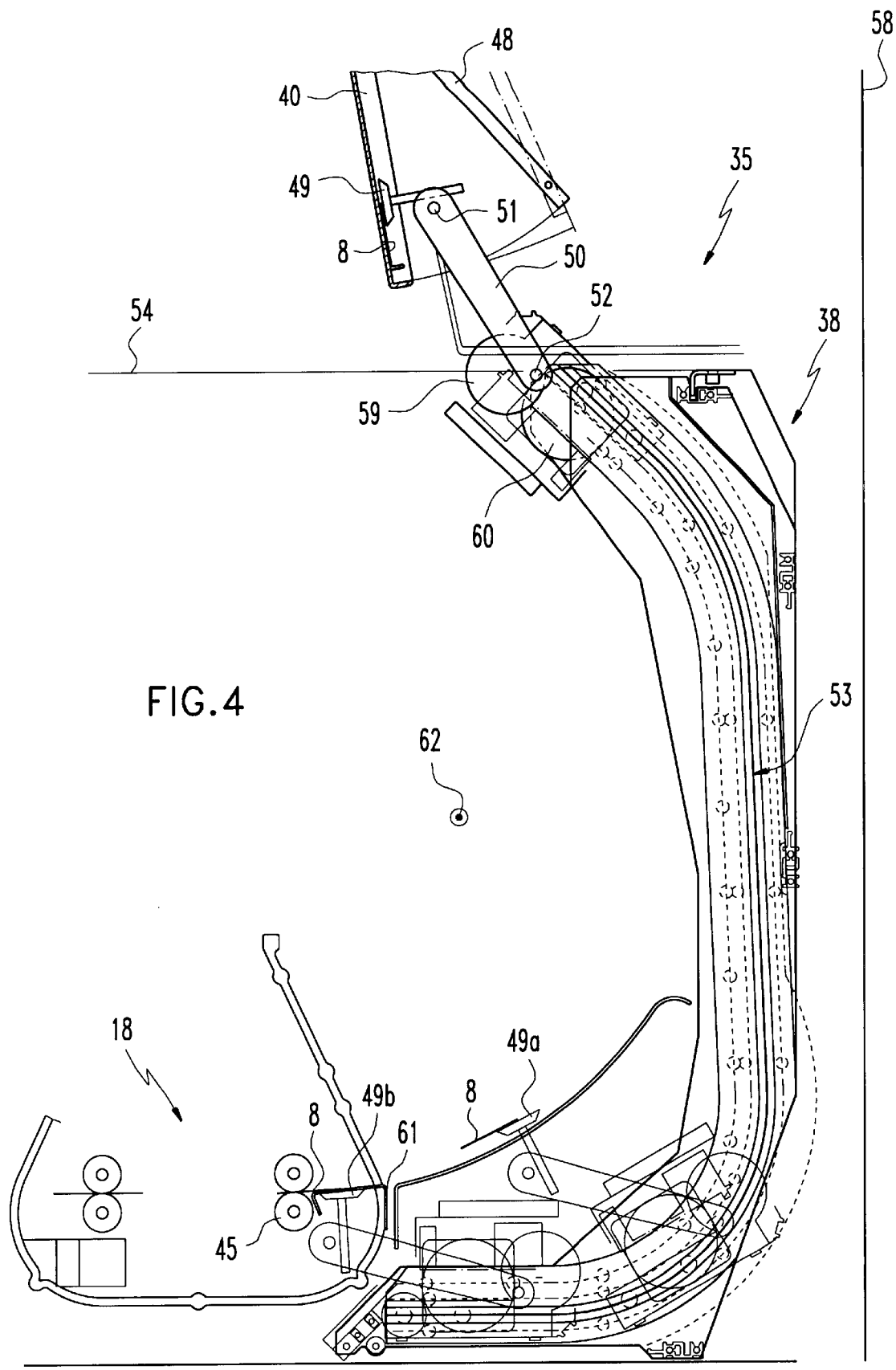
FIG. 4 shows details of a film-extraction location 35 inside the device illustrated in FIG. 2.

FIG. 4 illustrates details of film-extraction mechanism 38. It is mounted on housing 58 and accordingly physically separated, as schematically indicated by line 54, from film-extraction location 35, which rotates inside the housing, although operating in conjunction with it. Mechanism 38 is provided with means 49 of suction that extract film 8 from an open cassette 40, whereof the outward-pivoted cover 48 is schematically represented. Means 49 of suction communicate with mechanical controls by way of a lever 50 secured to wheels 59 and 60 that rotate on shafts 51 and 52. Wheels 59 and 60 are driven by a single motor with appropriate output mechanisms by way of a transmission 53. Means 49 of suction assume a position 49b while transporting film 8 to a baffle 61 and to set 45 of film-transport rollers and another position 49a while it is being transported from cassette 40 to set 45 of film transport rollers. As means 49 of suction travel from film-extraction location 35 to position 49b, film 8 is rotated approximately 120° around a horizontal axis 62 perpendicular to the plane of projection by transmission 53 and wheels 59 and 60.

Loading mechanism 39 essentially operates exactly like film-extraction mechanism 38 but is geometrically the mirror image of it. Some details of the mechanisms, of transmission 53 and its associated drive mechanisms for instance, may need to be altered for the film-insertion phase. The transmission could be S-shaped for example.

Figure 5:
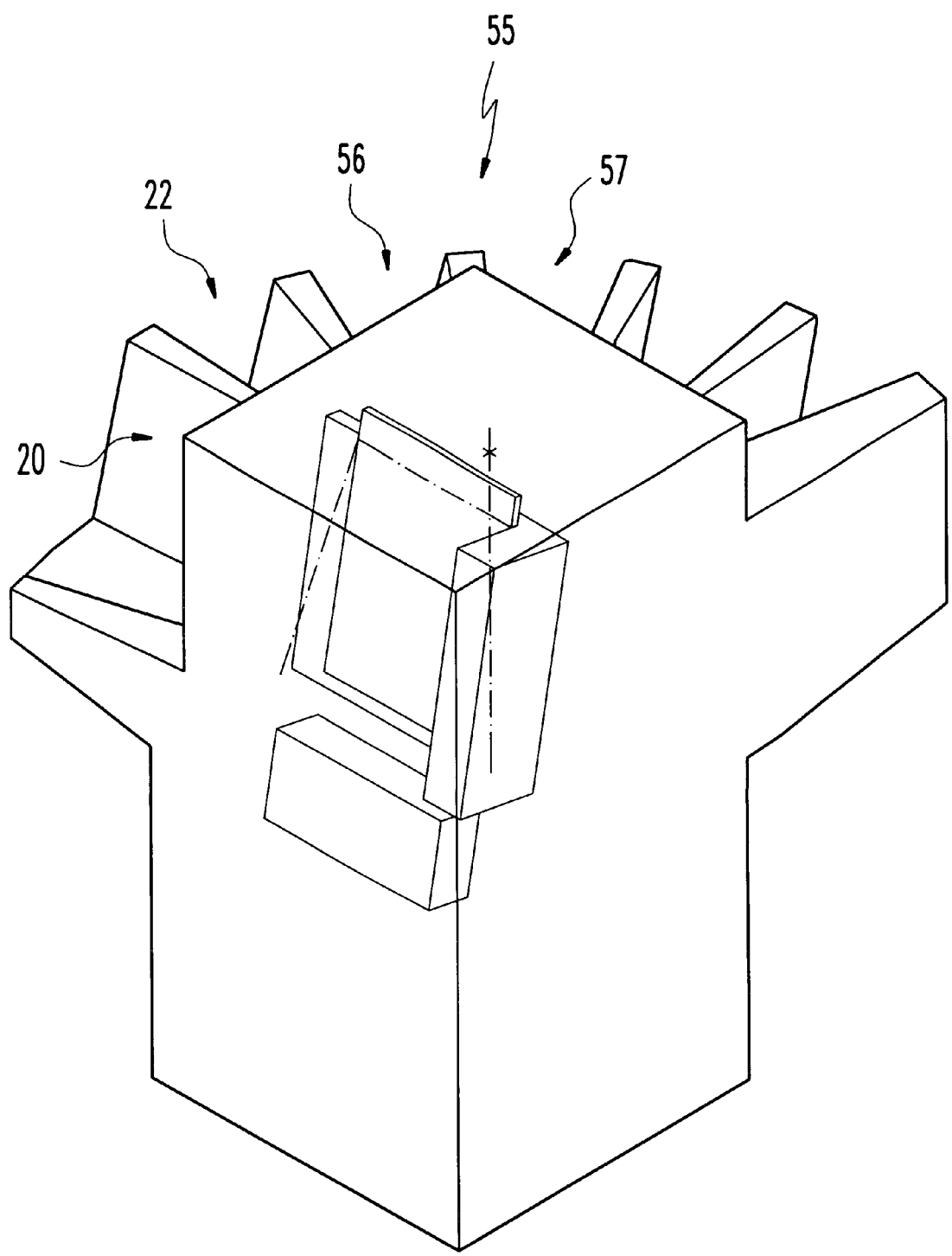
FIG. 5 illustrates another embodiment of the device in accordance with the present invention.

Various embodiments of the present invention have been hereintofore specified by way of example and without limiting its scope in any way, and alternative versions will occur to those of skill in the art. One such is illustrated in FIG. 5. In this embodiment illustrates how a rotating film-extraction location can simultaneously be exploited as a cassette-sorting location. Cassette-delivery location 22 has been supplemented by as many auxiliary cassette-delivery locations 56 and 57 as desired, constituting a delivery-end sorting mechanism 55. Appropriate controls, subject for example to the semiconductor memories mounted on the cassette, will assign each cassette to an appropriate compartment 56 or 57, in accordance for instance with the particular hospital department (internal medicine, emergency room, etc.) it is intended for.

It is also possible to employ only one auxiliary cassette-delivery location opposite the original, resulting in a lower-capacity sorter that will also help to decrease waiting time. In this event, the cassette can be forwarded to a format-appropriate delivery location without further rotation of the extraction location.

There has thus been shown and described a novel method and device for processing photostimulatable image plate which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of processing a photostimulatable image plate, whereby the image plate is extracted from a cassette, processed, and returned to a cassette, and whereby the cassette is forwarded from an input station to an output station, said method comprising the step of rotating the cassette about a vertical axis after an image plate is extracted from it and before an image plate is returned to it, said axis being perpendicular to two horizontal directions (I & K) in which the cassettes are transported, the first direction I being the direction the cassettes are transported from the input station to a plate-extraction station and the second direction K being the direction they are transported from the plate-extraction station to the output station.

2. Method as defined in claim 1, wherein the cassette (1 or 40) is transported in a substantially vertical orientation.

3. Method as defined in claim 1, wherein the cassette is rotated approximately 180°.

4. Method as defined in claim 1, wherein the cassette is transported substantially horizontally in one direction from the input station to the plate-extraction station and opened, the image plate is extracted from the cassette, the cassette is rotated, the image plate is read, erased and returned to the same cassette, and the cassette is then closed and transported in substantially the opposite direction to the output station.

5. In a device for processing a photostimulable image plate and having an input station where cassettes, each loaded with an image plate, are inserted, an output station where the cassettes are delivered, and an image plate-extraction station where an image plate is extracted from the cassette and an image plate is returned to it by an extraction mechanism, the improvement wherein the image plate-extraction station rotates a cassette about a vertical axis after a plate is extracted from the cassette and before a plate, after being extracted, read and erased, is returned to that cassette, said axis being perpendicular to two horizontal directions (I & K) in which the cassettes are transported, the first direction I being the direction the cassettes are transported from the input station to the plate-extraction station and the second direction K being the direction the cassette are transported from the plate-extraction station to the output station.

6. Device as defined in claim 5, wherein the cassette is transported in a substantially vertical orientation.

7. Device as defined in claim 6, further comprising a mechanism that extracts the image plate from the cassette and a mechanism that returns the image plate to the same cassette.

8. Device as defined in claim 5, further comprising a station where the image plate is read.

9. Device as defined in claim 5, wherein the input station and the output station are immediately adjacent each other.

10. Device as defined in claim 5, comprising a plurality of output stations.

11. Device as defined in claim 10, further comprising controls that obtain data from the cassette and accordingly divert the cassette to an associated output station.

12. Device as defined in claim 5, wherein the input station and the output station pivot around parallel axes on the same part of a housing.

13. Device as defined in claim 5, wherein the image plate-extraction station rotates a cassette by approximately 180°.

* * * * *